United States Patent [19]

Parsons

[11] 4,007,840
[45] Feb. 15, 1977

[54] SELECTION AND RETRIEVAL SYSTEM

[76] Inventor: Alfred H. Parsons, 18 Hawthorne Road, Sea Cliff, N.Y. 11579

[22] Filed: June 24, 1975

[21] Appl. No.: 589,747

[52] U.S. Cl. .......................... 209/80.5; 209/111.8
[51] Int. Cl.² ......................................... B07C 5/12
[58] Field of Search .............. 209/72, 111.8, 81 A, 209/74, 80.5

[56] References Cited
UNITED STATES PATENTS

| 2,269,767 | 1/1942 | Jayne | 209/111.8 |
| 2,794,282 | 6/1957 | Sherman et al. | 209/111.8 X |
| 3,625,358 | 12/1971 | Duperron | 209/111.8 |

Primary Examiner—Allen N. Knowles
Attorney, Agent, or Firm—Dennison, Dennison, Meserole & Pollack

[57] ABSTRACT

An information selection and retrieval system utilized in conjunction with multiple stored components constituting a bank of such components from which single components or group of components are to be both selected and retrieved by means of a magnetic selector mounted on a movable carrier. The magnetic selector adjusts relative to the stored components in accordance with an index guidance system.

8 Claims, 8 Drawing Figures

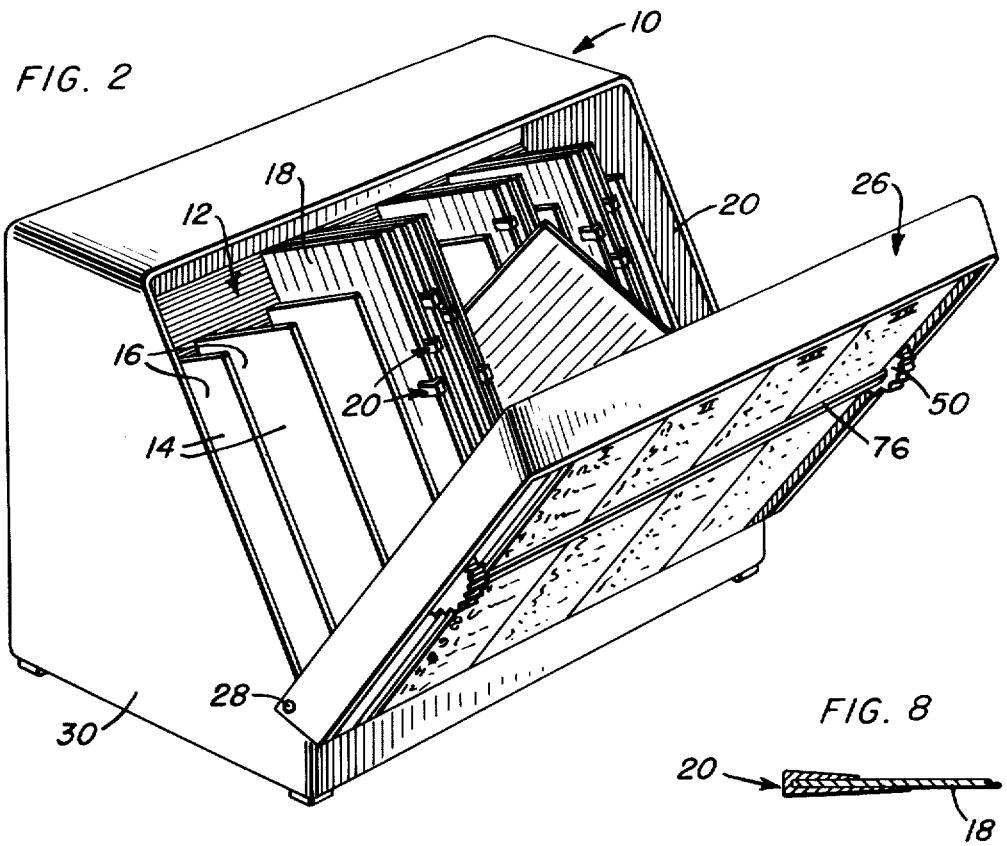
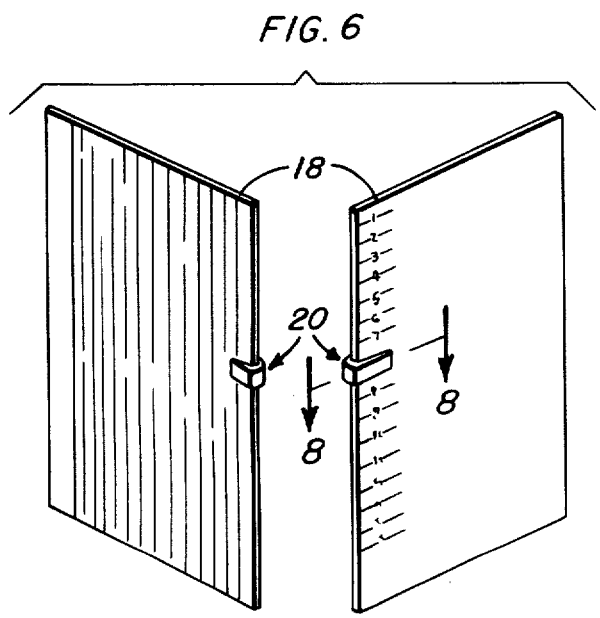
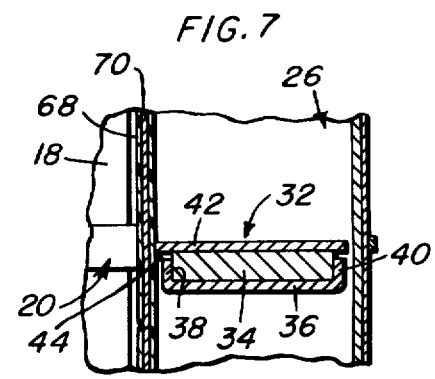

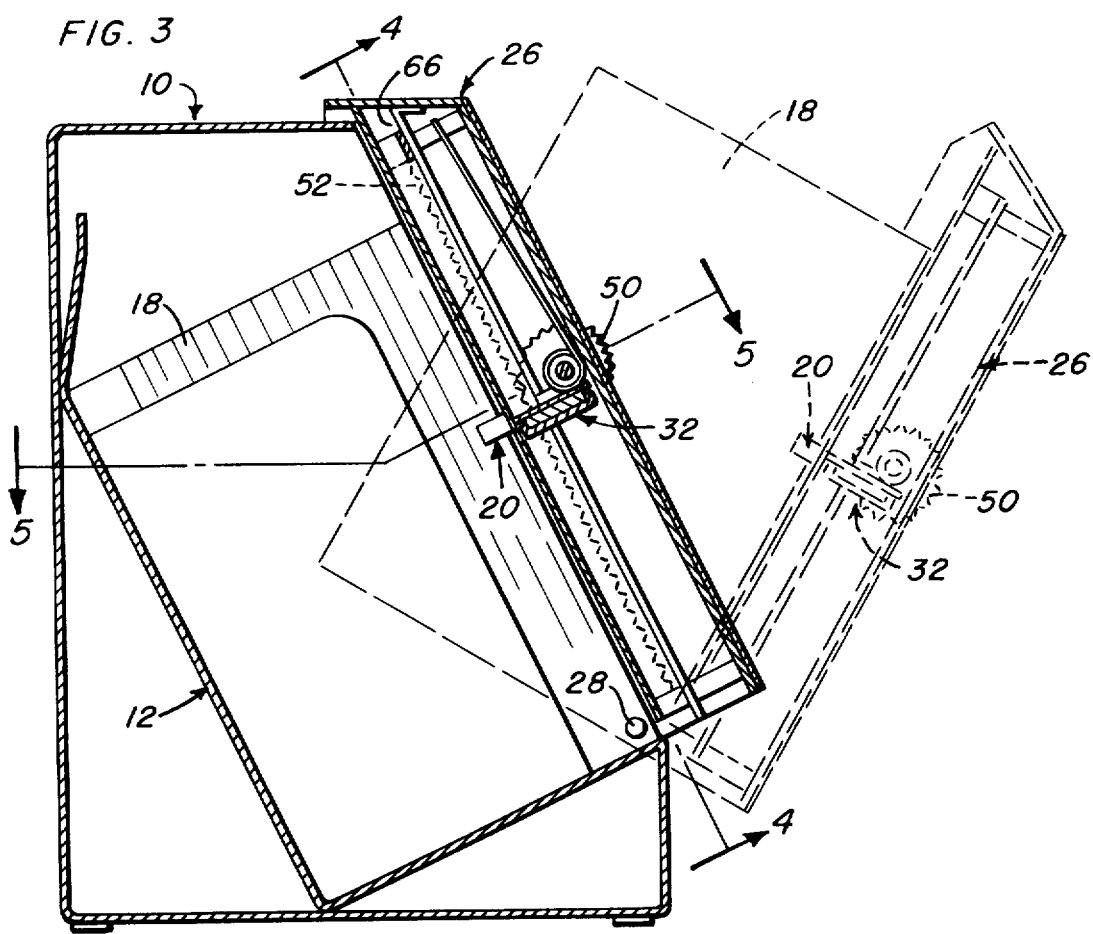
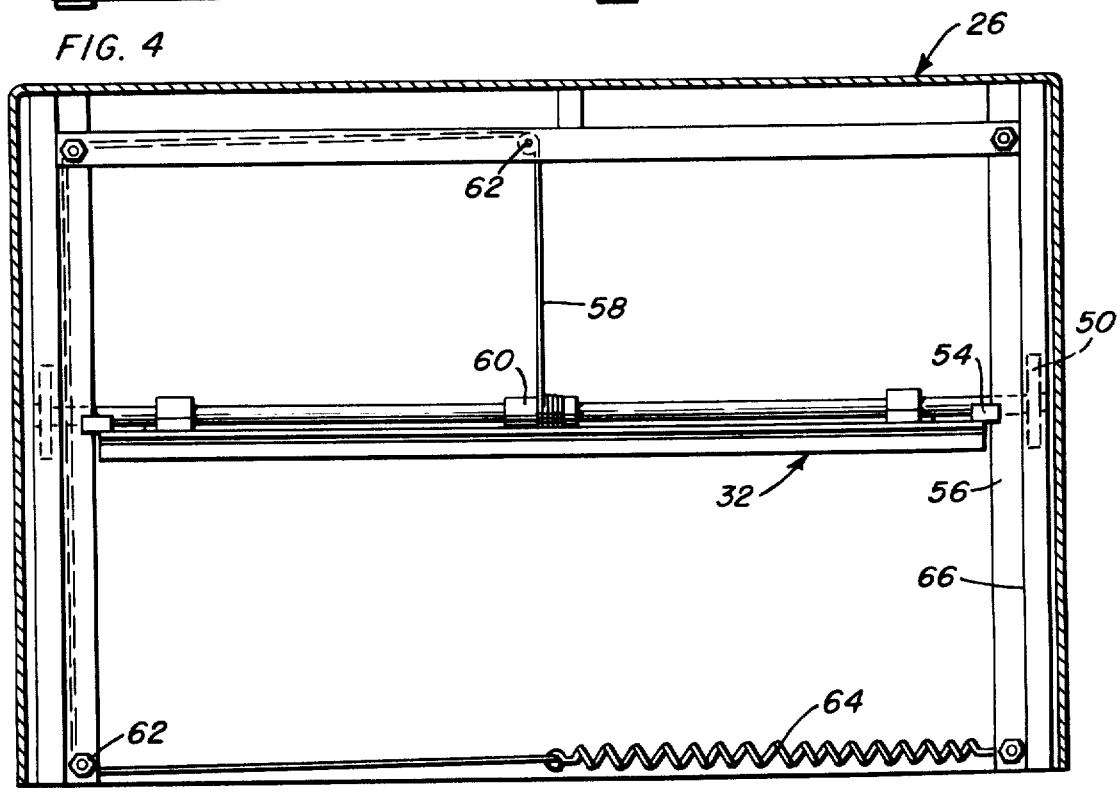

SELECTION AND RETRIEVAL SYSTEM

The present invention generally relates to an information retrieval system, and is more particularly concerned with a system for both the selection and retrieval of predetermined components, for example file cards, document containers, envelopes, and the like, from storage facilities utilizing magnetism as the means for effecting both the selection and the retrieval.

The invention herein is basically concerned with a unique system, adaptable to a wide variety of environments, wherein magnetism is utilized as both a means for selecting a predetermined component or group of components, and as the means by which the component or components are physically drawn from the storage facilities.

One of the significant objects of the invention resides in the fact that the proposed system allows selection and retrieval of selected cards or the like regardless of whether the components are stored in order or randomly stored.

The present invention also contemplates the utilization of a manual or power controlled carrier for support and manipulation of the magnetic selector means with the carrier having an index and index associated indicator for providing an index guided control of the selector.

The system proposed herein basically utilizes a magnetic selector mounted on a movable carrier with the selector traversing the face of a storage area wherein the individual components, whether these be document containing envelopes in a file box or parts containers in a warehouse, have magnetically attractable elements at specified locations thereon. Selection of a specific component is made possible utilizing an index system whereby orientation of an indicator, operatively connected to the magnetic selector, will automatically position the selector for alignment with the magnetic element associated with the component selected on the index with a withdrawal of the component being effected through a manipulation of the carrier.

These and other objects and advantages residing in the details of construction and operation will become apparent from the following detailed description of a preferred embodiment of the invention. Reference is had to the accompanying drawings forming a part hereof wherein like numerals refer to like parts throughout, and in which:

FIG. 2 is a perspective view of the card file with the front carrier or panel manipulated so as to withdraw a specified card;

FIG. 3 is an enlarged transverse cross-sectional view through the card file;

FIG. 4 is a cross-sectional view taken substantially on a plane passing along line 4—4 in FIG. 3;

FIG. 6 illustrates, in perspective, one of the components or cards with a magnetically attractable element thereon;

FIG. 7 is an enlarged cross-sectional detail taken substantially on a plane passing along line 7—7 in FIG. 5; and FIG. 8 is a cross-sectional detail taken substantially on a plane passing along line 8—8 in FIG. 6, illustrating details of the magnetic element or clip.

Figure 1:
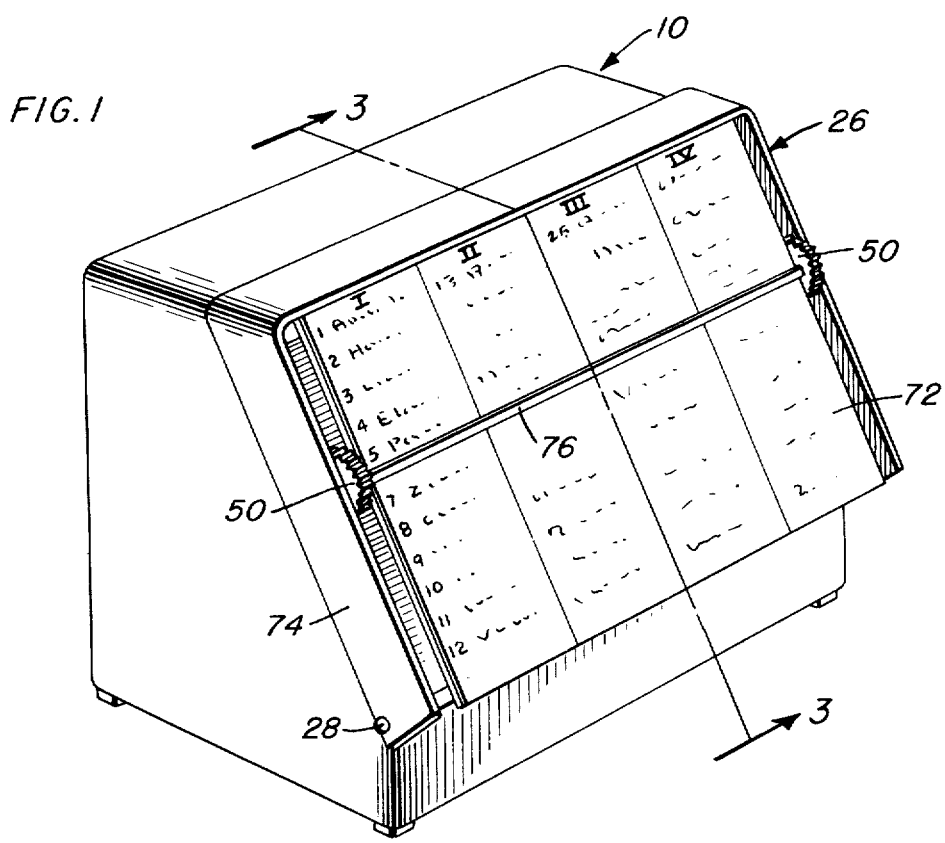
FIG. 1 is a perspective view of a card file incorporating the features of the present invention.
Figure 5:
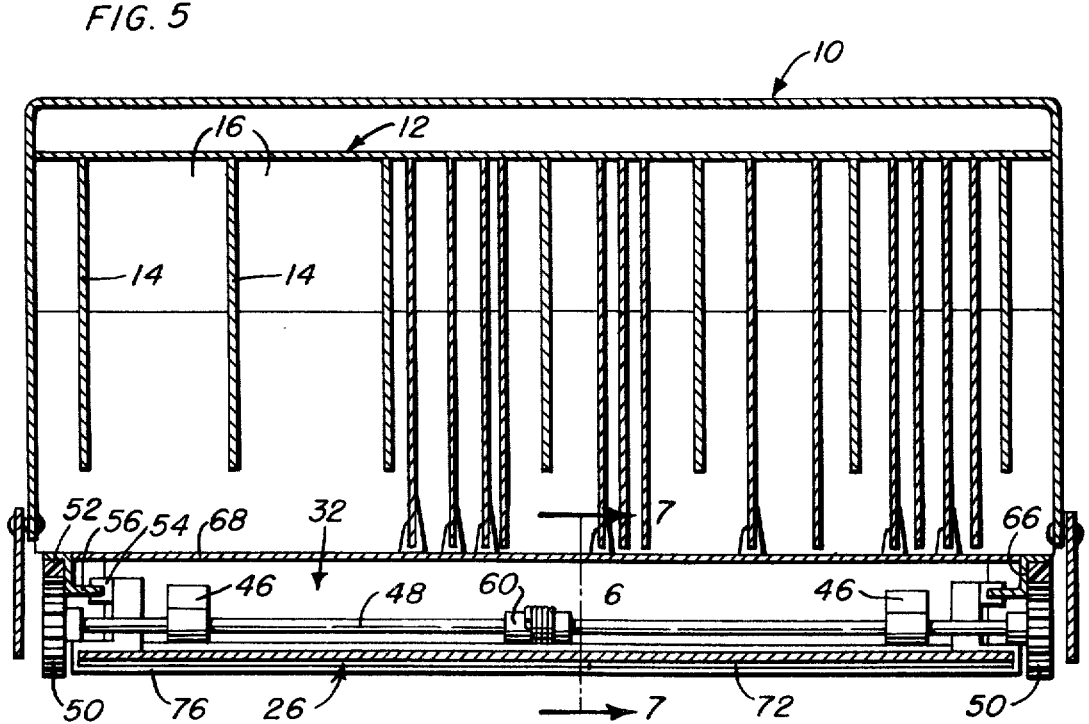
FIG. 5 is a cross-sectional view taken substantially on a plane passing along line 5—5 in FIG. 3.

Referring now more specifically to the drawings, the principles of the invention have been set forth in a preferred embodiment for purposes of illustration and not so as to constitute a limit on the invention.

In the illustrated embodiment, reference numeral 10 designates a file case. The file 10 incorporates an internal chamber 12 which, if so desired for purposes of card segregation and/or stabilization, can be provided with spaced partitions 14 forming individual storage compartments 16. As will be best appreciated from FIGS. 2 and 3, the chamber 12 will preferably be inclined upwardly and rearwardly whereby the individual stored components, in this instance cards or envelopes 18, will be orientated upright within the compartments with the forward edges also inclined upwardly and rearwardly for a simplified forward and outward pivoting of the selected card or cards in a manner to be described subsequently. The front edge of each of the components, hereinafter referred to generically as cards 18, will normally be completely exposed through the open face 20 of the file 10 with this forward edge having one or more magnetically attractable areas 20 defined thereon. In the illustrated embodiment, these areas 20 are defined by metallic clips which encircle the leading or forward edge of the associated card 18. Noting FIG. 8 in particular, the clip 20 will preferably have unequal legs 22 and 24 so as to facilitate a mounting of the clip on the card edge with each of the legs having a tapered outer surface so as to avoid any projections which might interfere with the replacement of the card or cards in the storage chamber.

It will be appreciated that the magnetically responsive areas on any set of cards used will be sequentially spaced along the edges of the cards to allow for a selection of the individual card or cards.

Positioned forward of the component storage area 12 is a movable carrier which, while it may be in the nature of a sliding drawer front, has been illustrated as a front wall 26 pivotally mounted, at the lower end thereof as indicated by pivot pins 28, to the side walls 30 of the file 10 for movement between a first position directly overlying the open face 20 of the file 10 and paralleling the forward edges of the cards 18 closely adjacent thereto, and a second outwardly swung position. These two positions of the carrier wall will be best appreciated from FIGS. 2 and 3 of the drawings.

The movable carrier, or in the illustrated embodiment the front wall 26, mounts a magnetic selector 32 for movement thereon across the exposed forward edges of the cards 18.

The magnetic selector 32, in the illustrated embodiment, consists of an elongated magnetic bar 34 spanning the full width of the chamber 12. The magnetic bar 34 fits within a full length steel bar 36 having upturned inner and outer flanges 38 and 40 terminating short of the upper surface of the bar 34. In addition, a steel plate 42 overlies the upper surface of the bar and has the inner edge portion thereof projecting beyond the inner flange 38 whereby a focusing gap 44 is provided which tends to concentrate the magnetic attraction over a small area so as to allow for a greater degree of selectivity in situations wherein many cards are utilized and the magnetically attractable clips 20 or the like must of necessity be relatively closely spaced. The magnetic bar 34 and adjoining steel plates 36 and 42 can be interconnected in any appropriate manner, possibly even merely magnetically retained if so desired.

In order to provide for a vertical movement of the selector 32, a pair of brackets 46 affixed to the upper plate 42 rotatably support an elongated rod 48, the opposed ends of which have enlarged manually manipulable pinions 50 affixed thereto. These pinions in turn travel in mesh with associated vertical racks 52. The vertical movement of the selector 32 can be guided by appropriate channel guides 54 affixed to the opposed end portions of the selector 32 and slidably engaging vertical guide flanges 56 constituting a portion of the structure of the front wall 26.

The magnetic selector 32 is to be counterbalanced so as to maintain itself in any vertically adjusted position. This can be effected by utilizing an elongated cable 58 having one end portion wound on a drum or sleeve 60 affixed centrally to the rod 48 and extending therefrom over a series of friction reducing rods or pulleys 62 to a tension spring 64 anchored at a remote point on the framework 66 of the front wall panel 26. Basically, the spring 64 counterbalances the weight of the selector 32 for a retention thereof in any adjusted position.

The inner face of the front wall 26 will normally be covered by a panel 68 enclosing the movable selector bar 32 and the operating components associated therewith. This panel 68 can be secured in any appropriate manner, and may in fact be retained in position by magnetic attraction to the selector 32 by the provision of a series of metal strips 70 on or within the panel 68. If such strips 70 are in fact used, they will normally be aligned with the forward edges of the compartment forming partitions 14.

The carrier wall 26 also includes a front panel 72 affixed to the support structure 66 with the opposed side edges thereof spaced from the flange-like edge member 74 of the wall 26 for both the accommodation of the pinions 50 and the indicator strip or bar 76 which is affixed to the magnetic selector 32 and projects outwardly into overlying relation to the outer face of the front panel 72. The indicator strip 76 is of course aligned with the magnetic selector 32 and at all times provides an accurate indication of the location of the selector 32.

An index of any appropriate type will be provided on the front face of the panel 72 as a guide to a proper alignment of the selector 32. One form of index is illustrated in the drawings and consists of multiple columns conforming to the individual compartments or groups of compartments within the file chamber. Each column in turn will have multiple entries. With such an index, were, as an example, it is the intention of the user to pull number 6 from column III, the strip indicator need merely be aligned with row 6 and the front carrier wall 26 swung outwardly. This would cause a forward drawing of all of those cards 18 on which the magnetically attractable element 20 aligns with the magnetic selector 32. The card or cards from the compartment corresponding to column III would be those specifically sought. Upon removal of these cards, the remaining cards corresponding to row 6 in the remaining columns will merely be returned to their original position upon a closing of the carrier wall. For purposes of convenience, the cards can also be color coded. As an example, all of the cards in column III can have a green indicator thereon whereby, in those situations wherein selected cards from each column are drawn forward, the colors of the withdrawn cards will provide an immediate indication of what column they relate to. As a variation, the full length magnetic bar 34 of the selector 32 can be replaced by a magnetic element of a length approximately that of the width of an index column with this magnetic element being longitudinally shiftable along the selector bar for alignment with the desired column prior to a vertical adjustment of the selector through a manipulation of the pinions 50. A further variation could utilize separate electromagnetic elements aligned with the individual columns with each being selectively energized in accordance with the particular compartment containing the desired card or cards either before or after a vertical adjustment of the selector 32 for alignment with the magnetic element on the card. In its simplest form, only a single compartment and associated index column will be provided in conjunction with a single magnetic bar, requiring only a vertical alignment of the indicator strip 76 for a proper orientation of the selector 32 for both the selection and, through a pivoting of the carrier wall 26, a retrieving of the desired card or cards. Incidentally, it will be appreciated that when the storage components involved are cards, envelopes, or the like, the selection and removal of individual components or group of preselected components can be easily effected. Were, on the contrary, the system of the invention utilized in conjunction with components of substantial bulk, it is conceivable that simultaneous retrieval of multiple components might be difficult. In either event, it is particularly significant that magnetism be utilized both as the means for selecting the component and as the means for retrieving the component from its stored position. This is basically achieved by a mounting of the magnetic selector directly on the movable carrier which is manipulable toward and away from the stored components in conjunction with the provision of means on the selector for magnetically locking to the component desired in accordance with an index, guide or the like.

While the invention has been described primarily in terms of a file case for small index cards and the like incorporating a pivoted front wall, it will be appreciated that the information bearing components, rather than index cards, can be small containers, envelopes for documents, etc. By the same token, the carrier, rather than a pivoted wall, can be in the nature of a sliding drawer or drawer front which pulls straight out subsequent to an alignment of the magnetic selector with the desired component.

The foregoing is considered illustrated only of the principles of the invention. As obvious modifications and variations may occur to those skilled in the art, it is not desired to limit the invention to the exact construction and operation shown and described. Accordingly, all suitable modifications and equivalents may be resorted to, falling within the scope of the invention as claimed.

What is claimed as new is:

1. A selection and retrieval system for use in conjunction with multiple independently retrievable stored components comprising, a magnetic selector, magnetically attractable areas provided at generally differing predetermined positions on the components, a carrier positioned adjacent said components and mounting said selector, means for moving said selector on and relative to said carrier for a selective alignment of the selector with the magnetically attractable area on each of said components, said magnetic selector, upon alignment with each of said magnetically attractable areas on said components, effecting a direct magnetic interlock therewith and independently of the components provided with magnetically attractable areas at different predetermined positions for a selection and retrieval of each component independently of the components provided with magnetically attractable areas at different predetermined positions, and means for moving said carrier, with the magnetic selector mounted thereto, away from said stored components for a retrieval and separation of all components directly magnetically interlocked to the selector independently of the remaining components.

2. The system of claim 1 wherein said components are vertically orientated and stacked in a chamber with each component having a front portion having the magnetically attractable area thereon, said carrier comprising a front wall positioned forward of the chamber and front portions of the components, said means for moving said carrier including means mounting said wall relative to said chamber for movement between a first position immediately adjacent and overlying the chamber and a second position outwardly moved therefrom, the outward movement of the wall effecting an outward movement of only those components directly magnetically interlocked with the magnetic selector.

3. The system of claim 2 including index means, said means for moving said magnetic selector being operatively associated with said index means for guidance thereby in locating said magnetic selector in a predetermined position relative to the components, said selector travelling immediately adjacent the inner surface of the wall, said index means being orientated on the outer face of said wall.

4. A selection and retrieval system for use in conjunction with multiple stored components comprising, a magnetic selector, magnetically attractable areas provided at predetermined positions on the components, a carrier mounting said selector, means for moving said selector for a selective alignment of the selector with a magnetically attractable area on at least one of said components, index means, said means for moving said selector being operatively associated with said index means for guidance thereby in locating said selector in a predetermined position relative to the components, said magnetic selector, upon alignment with a magnetically attractable area on at least one of said components effecting a magnetic interlock therewith, said carrier being movable for a retrieval of the component magnetically interlocked to the selector, said selector comprising an elongated magnetic bar unit mounted for vertical travel relative to the components and the magnetically attractable areas thereon, said components being vertically orientated and horizontally stacked in a chamber with each component having a front edge juxtaposed the path of vertical travel of the magnetic bar unit, said magnetic bar unit being horizontally orientated and at approximately right angles to the front edges of the components, said magnetically attractable areas comprising, in each instance, a metallic clip affixed to the front edge portion of the associated component, said carrier comprising a front wall positioned forward of the chamber and front edges of the components, and means mounting said wall relative to said chamber for movement between a first position overlying and enclosing the chamber and a second position outwardly therefrom, the outward movement of the wall effecting an outward movement of any component magnetically interlocked with the selector.

5. The system of claim 4 wherein said selector travels immediately adjacent the inner surface of the wall, said index means being orientated on the outer face of said wall.

6. The system of claim 5 wherein said means for moving said selector includes shaft means rotatably affixed to said selector, pinion means fixed to said shaft means, rack means fixed to said carrier for travel of the pinion means therealong and a corresponding movement of the selector, and means for assisting in the maintenance of the selector in any moved position.

7. The system of claim 6 including an indicator fixed to said selector and projecting therefrom in overlying relation to said index means for correlation of the position of the selector with the index means.

8. A selection and retrieval system for use in conjunction with multiple stored components comprising, a magnetic selector, magnetically attractable areas provided at predetermined positions on the components, a carrier mounting said selector, means for moving said selector for a selective alignment of the selector with a magnetically attractable area on at least one of said components, index means, said means for moving said selector being operatively associated with said index means for guidance thereby in locating said selector in a predetermined position relative to the components, said magnetic selector, upon alignment with a magnetically attractable area on at least one of said components effecting a magnetic interlock therewith, said carrier being movable for a retrieval of the component magnetically interlocked to the selector, said selector comprising an elongated magnetic bar unit mounted for vertical travel relative to the components and the magnetically attractable areas thereon, said magnetic bar unit including a forward edge directed toward the stored components, a first plate of magnetically attractable material overlying said magnetic bar unit along the length thereof and projecting beyond the forward edge thereof, a second plate of magnetically attractable material underlying said magnetic bar unit and having an upturned flange along the forward edge thereof lying against the forward edge of the magnetic bar unit inward of the outer extent of the forward edge of the upper plate and terminating short of the upper plate so as to define a narrow space for exposure of the front edge of the magnetic bar unit therethrough.

* * * * *